US009282298B2

(12) United States Patent
Cuddeback et al.

(10) Patent No.: US 9,282,298 B2
(45) Date of Patent: *Mar. 8, 2016

(54) AUTOMATED CAMERA ASSEMBLY WITH INFRARED DETECTOR CURTAIN

(71) Applicant: Non Typical, Inc., De Pere, WI (US)

(72) Inventors: Mark Cuddeback, Green Bay, WI (US); Gregory Cook, Holliston, MA (US)

(73) Assignee: Non-Typical, Inc., De Pere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,157

(22) Filed: Nov. 3, 2014

(65) Prior Publication Data
US 2015/0049200 A1 Feb. 19, 2015

Related U.S. Application Data

(63) Continuation of application No. 13/645,230, filed on Oct. 4, 2012, now Pat. No. 8,891,001.

(51) Int. Cl.
*H04N 5/238* (2006.01)
*H04N 7/18* (2006.01)
*H04N 5/33* (2006.01)
*G03B 7/099* (2014.01)
*G03B 13/00* (2006.01)
*G03B 17/38* (2006.01)
(Continued)

(52) U.S. Cl.
CPC .................. *H04N 7/188* (2013.01); *G03B 5/00* (2013.01); *G03B 17/38* (2013.01); *G08B 13/19652* (2013.01); *H04N 5/2254* (2013.01); *H04N 5/33* (2013.01); *H04N 5/23222* (2013.01)

(58) Field of Classification Search
CPC ...... H04N 7/188; G08B 13/19; G08B 13/193; G08B 13/19652; G08B 13/19617; G08B 13/19619; G08B 13/19641; G08B 13/19643
USPC ......... 348/151, 157, 158, 164, 152, 155, 154, 348/369; 396/274, 263, 427, 433; 250/347; 340/541
See application file for complete search history.

(56) References Cited

U.S. PATENT DOCUMENTS 4,960,995 A * 10/1990 Neumann et al. ............. 250/347
5,739,753 A    4/1998 Porter
(Continued)

FOREIGN PATENT DOCUMENTS

DE    3722362    1/1989
DE    4006631    9/1991
(Continued)

*Primary Examiner* — John Villecco
(74) *Attorney, Agent, or Firm* — Michael Best & Friedrich LLP

(57) ABSTRACT

The present invention provides an automated camera assembly comprising a camera (e.g., a digital camera) having a field of vision and a detector for detecting a subject and triggering the camera. The detector has an adjustable field of view and includes a sensor (e.g., an IR sensor) having a maximum field of view, and a curtain for reducing the maximum field of view to an adjusted field of view. The curtain comprises at least two sections (e.g., opaque members) coupled to move together from a first position corresponding with the maximum field of view to a second position corresponding with the adjusted field of view smaller than the maximum field of view. Movement of the curtain relative to the sensor can be linear, pivotal, radial, or any other suitable movement.

11 Claims, 9 Drawing Sheets

(51) Int. Cl.
    *G08B 13/196*     (2006.01)
    *G03B 5/00*     (2006.01)
    *H04N 5/225*     (2006.01)
    *H04N 5/232*     (2006.01)

(56) References Cited

U.S. PATENT DOCUMENTS

| | | | |
|---|---|---|---|
| 6,987,267 B1 * | 1/2006 | Monroe et al. | 250/342 |
| 7,066,662 B2 | 6/2006 | Cuddeback et al. | |
| 7,438,438 B2 | 10/2008 | Sandell | |
| 7,456,737 B2 | 11/2008 | DiPoala | |
| 7,471,334 B1 | 12/2008 | Stenger | |
| 7,488,941 B2 | 2/2009 | Lee et al. | |
| 8,258,478 B2 | 9/2012 | Walters et al. | |
| 8,632,264 B2 * | 1/2014 | Schmit et al. | 396/448 |
| 2005/0043907 A1 * | 2/2005 | Eckel et al. | 702/62 |
| 2007/0036535 A1 * | 2/2007 | Chee | 396/153 |
| 2008/0001071 A1 * | 1/2008 | Lee et al. | 250/221 |
| 2008/0002396 A1 * | 1/2008 | Sandell | 362/147 |
| 2008/0042832 A1 * | 2/2008 | DiPoala | 340/541 |
| 2009/0009597 A1 * | 1/2009 | Belkin | 348/143 |
| 2009/0072127 A1 * | 3/2009 | Dodson | 250/216 |
| 2010/0182153 A1 * | 7/2010 | Jensen | 340/573.4 |
| 2010/0237248 A1 | 9/2010 | Walters et al. | |
| 2011/0050902 A1 * | 3/2011 | Hanses et al. | 348/143 |
| 2011/0279683 A1 * | 11/2011 | Yarmchuk et al. | 348/169 |
| 2013/0010109 A1 | 1/2013 | Chen et al. | |
| 2013/0010183 A1 | 1/2013 | Chen et al. | |
| 2014/0098256 A1 | 4/2014 | Cuddeback et al. | |

FOREIGN PATENT DOCUMENTS

| | | |
|---|---|---|
| DE | 4023341 | 1/1992 |
| DE | 4100536 | 7/1992 |
| EP | 1120763 | 8/2001 |
| JP | 2003323681 | 11/2003 |
| JP | 200537296 | 2/2005 |
| WO | 2011148231 | 12/2011 |

* cited by examiner

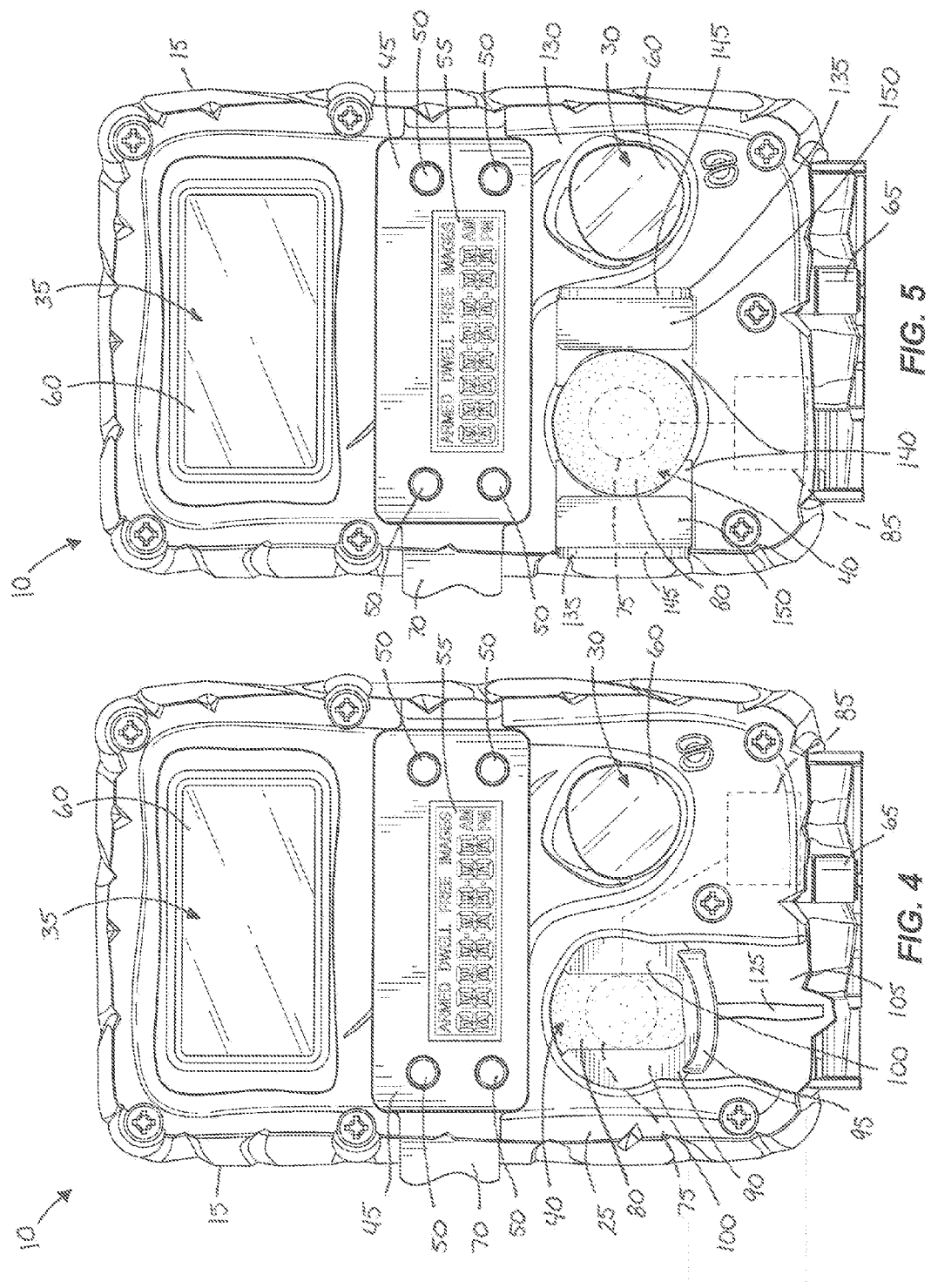

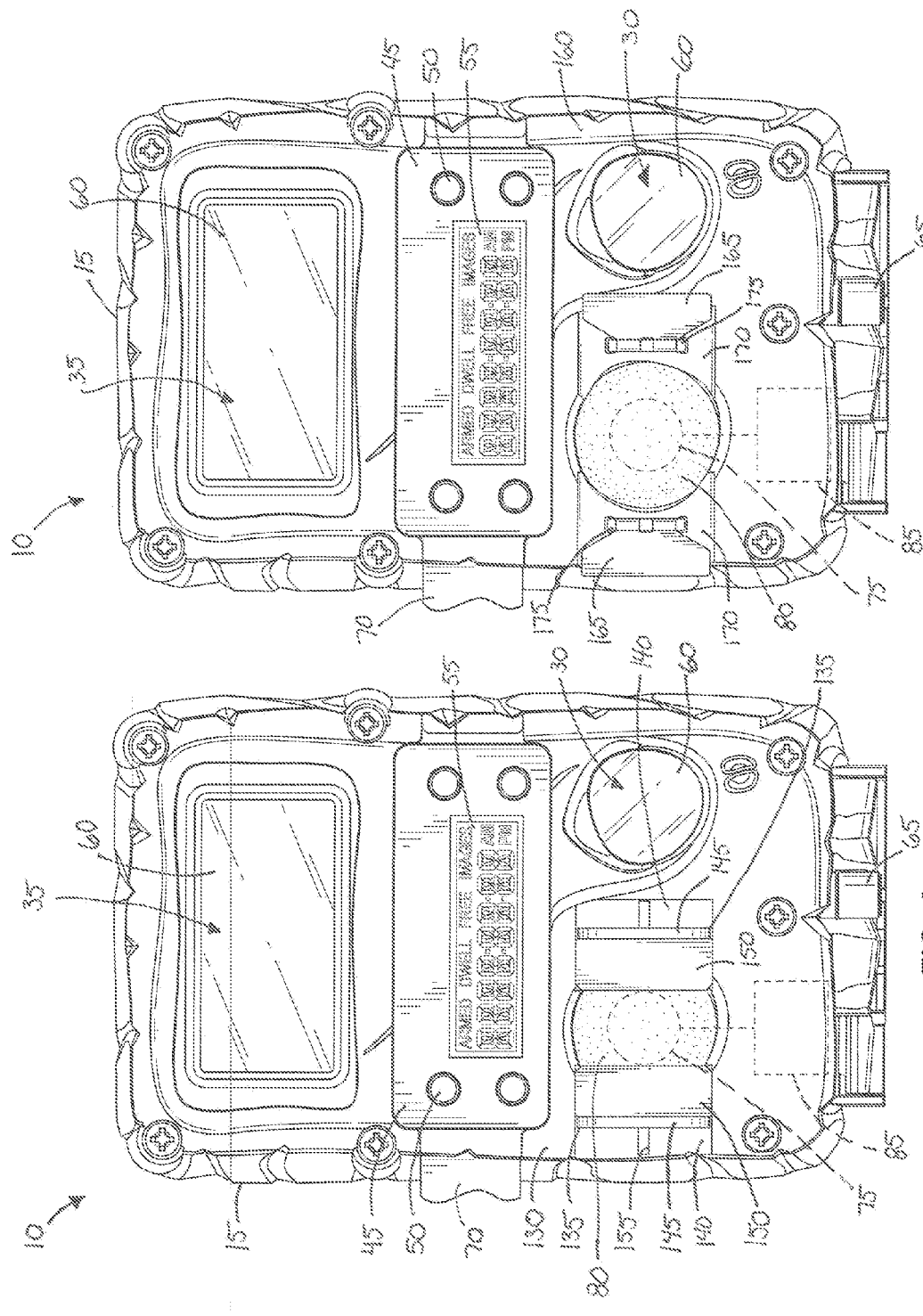

AUTOMATED CAMERA ASSEMBLY WITH INFRARED DETECTOR CURTAIN

BACKGROUND

The present invention relates generally to trail cameras and, more specifically, to trail cameras having detectors for determining when to take a picture or video.

Trail cameras (commonly called "trail cams") are used to take pictures or videos of certain subjects, such as wildlife. In order to trigger the camera (e.g., take a picture or start a video), trail cams typically include a detector that detects that a subject is within view of the camera. The detector can detect a variety of variables, such as sound, opacity, geomagnetism, reflection of transmitted energy, electromagnetic induction, and vibration. Most trail cams used today utilize an infrared ("IR") detector for triggering the camera.

On an IR trail cam, the IR detector is positioned to receive radiation from the direction that the camera is pointing. A lens (e.g., a Fresnel lens) can be positioned in front of the IR detector to gather IR radiation and define a field of view. The detector will trigger the camera when a subject is detected in the detector's field of view. Typically, the detector's field of view is the same as the camera's field of vision so that an object sensed by the IR detector is within the field of vision of the camera. When the IR detector senses a change in the IR radiation within the field of view, it sends a signal to activate the camera.

Because the detector's field of view is the same as the camera's field of vision, pictures taken with the above system commonly result in the subject (i.e., the object emitting IR radiation) being positioned on the edge of the picture. In order to solve this problem, some cameras design the detector's field of view to be narrower and centered with respect to the camera's field of view. The result is that the detector does not trigger the camera until the subject is more centered within the camera's field of vision.

SUMMARY

The present invention provides an automated camera assembly comprising a camera (e.g., a digital camera) having a field of vision and a detector for detecting a subject and triggering the camera. The detector has an adjustable field of view and includes a sensor (e.g., an IR sensor) having a maximum field of view, and a curtain for reducing the maximum field of view to an adjusted field of view. The curtain comprises at least two sections (e.g., opaque members) coupled to move together from a first position corresponding with the maximum field of view to a second position corresponding with the adjusted field of view smaller than the maximum field of view. Movement of the curtain relative to the sensor can be linear, pivotal, radial, or any other suitable movement.

The present invention also provides a method of adjusting a field of view of a detector on an automated camera assembly having a camera positioned within a housing. The detector includes a curtain having at least two sections coupled for simultaneous movement, and the method comprises detecting a first subject within a maximum field of view of the detector, triggering the camera after detecting the first subject within the maximum field of view, and adjusting the maximum field of view of the detector to an adjusted field of view of the detector by moving the at least two curtain sections together from a first position corresponding with the maximum field of view to a second position corresponding with the adjusted field of view smaller than the maximum field of view. The method further comprises detecting a second subject within the adjusted field of view and triggering the camera after detecting the second subject within the adjusted field of view. Preferably, the detector comprises a sensor, and the step of adjusting includes moving the at least two curtain members in front of the sensor, such as by linearly sliding, pivoting, or moving radially.

Other aspects of the invention will become apparent by consideration of the detailed description and accompanying drawings.

BRIEF DESCRIPTION OF THE DRAWINGS

FIG. 4 is a front view of the camera assembly of FIG. 2 illustrating the curtain in a second position.

FIG. 5 is a front view of a second embodiment of the present invention including a different curtain shown in a first position.

FIG. 6 is a front view of the camera assembly of FIG. 5 illustrating the curtain in a second position.

FIG. 7 is a front view of a third embodiment of the present invention including a different curtain shown in a first position.

Figure 1:
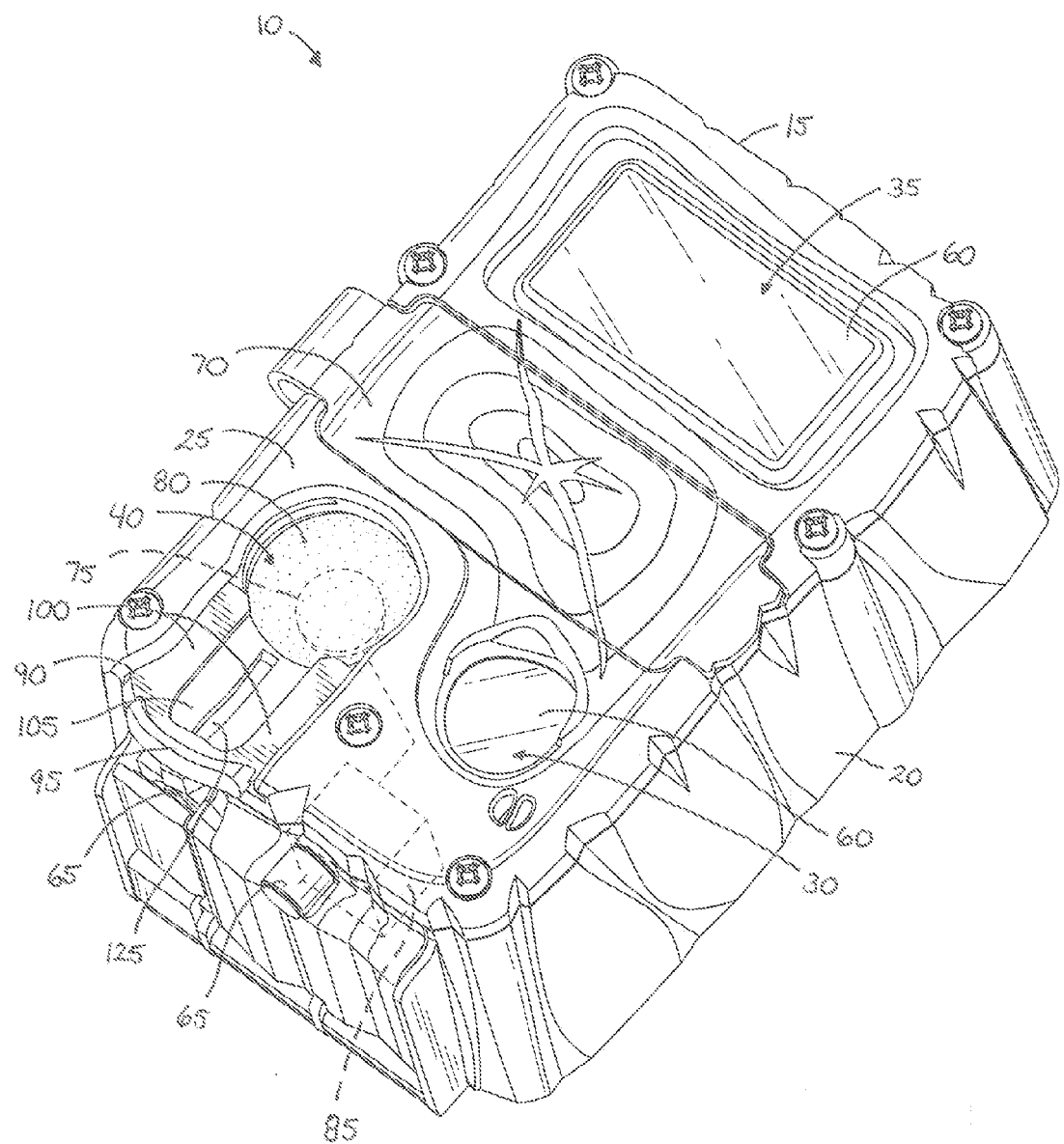
FIG. 1 is a perspective view of a camera assembly embodying the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-4 illustrate an automated wildlife surveillance system or trail camera assembly 10 that can be attached to a mounting structure (e.g., a tree, a post, etc.). The camera assembly 10 includes a housing 15 that includes a base 20 and a cover 25 that is secured to the base 20. The housing 15 encloses and supports a camera 30 (e.g., a digital camera), an illumination source 35 (i.e., camera flash), and a detector 40 for taking pictures and/or video (described collectively as media) of subjects (e.g., wildlife). The housing 15 also supports a user interface 45 that has several button switches 50 and a display 55. The cover 25 has several transparent windows 60 so that the camera 30, the illumination source 35, and the display 55 (and optionally, the detector 40) are protected from the environment while also providing exposure (i.e., a clear line of sight) for the camera 30, the illumination source 35, and the detector 40 through the cover 25. The camera assembly 10 also has electrical and/or electronic connections 65 that provide power to components of the camera assembly 10 and to download the media stored in the camera 30. As illustrated, a strap closure 70 (e.g., formed of a soft, resilient material) is attached to the housing 15 to enclose the user interface 45 (e.g., to protect the user interface 45 from debris, water, sunlight, rain, etc.) when not in use. As will be appreciated, the camera assembly 10 can include other components (e.g., additional sensors, not specifically discussed herein).

The illustrated detector 40 includes a passive infrared ("PIR") sensor 75 and a lens 80 (e.g., a Fresnel lens). The sensor 75 detects a subject and outputs a signal to a processor 85 in response to detection of the subject. The lens 80 defines a field of view of the detector 40 and focuses infrared radiation generated or reflected by a warm object in the field of view onto the PIR sensor 75. Generally, the detector 40 has a wide field of view (e.g., approximately 45-180°) to encompass a large area of the environment in front of the camera assembly 10.

Figure 2:
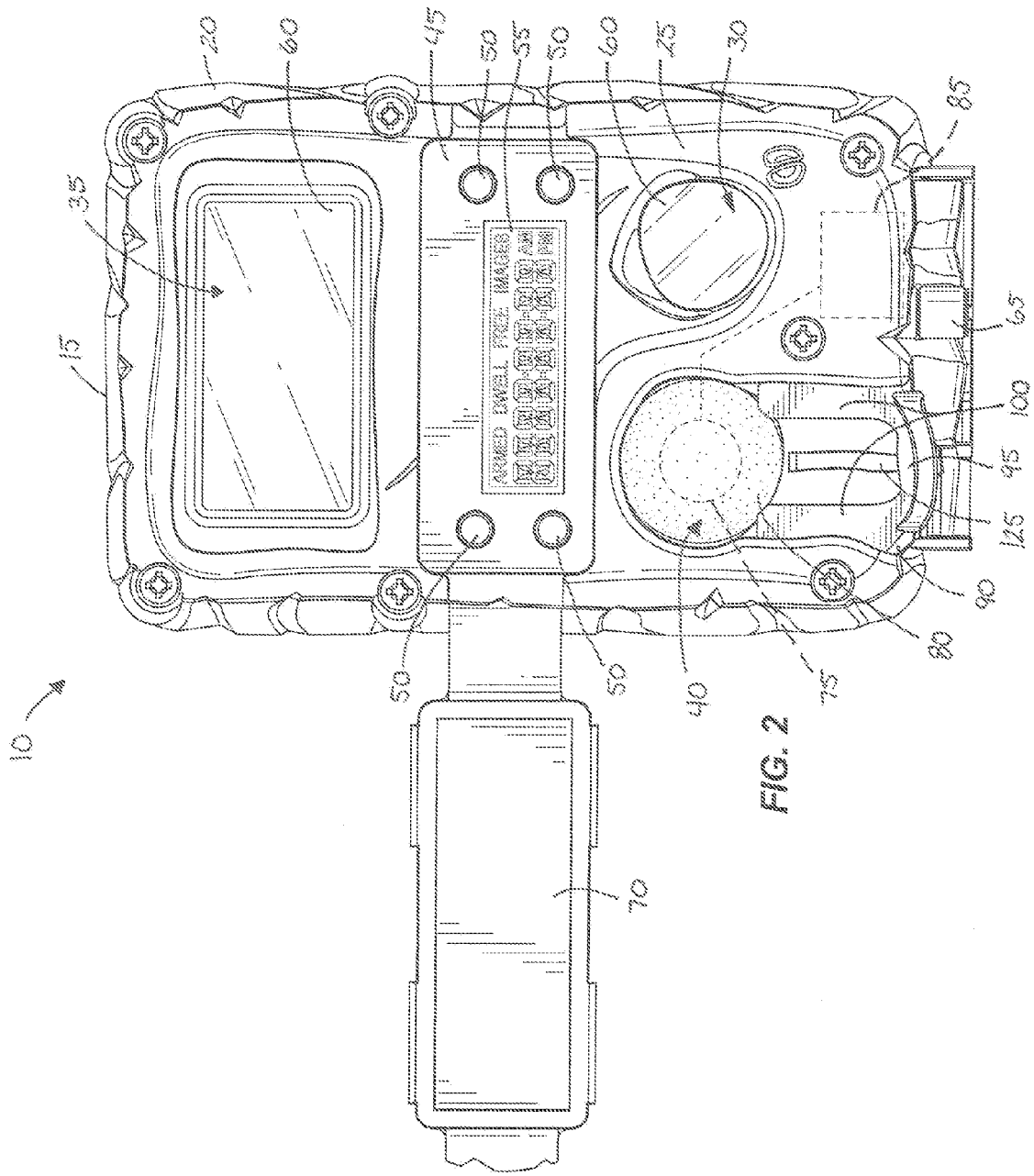
FIG. 2 is a front view of the camera assembly of FIG. 1 illustrating a housing and a detector having a curtain in a first position.
Figure 3:
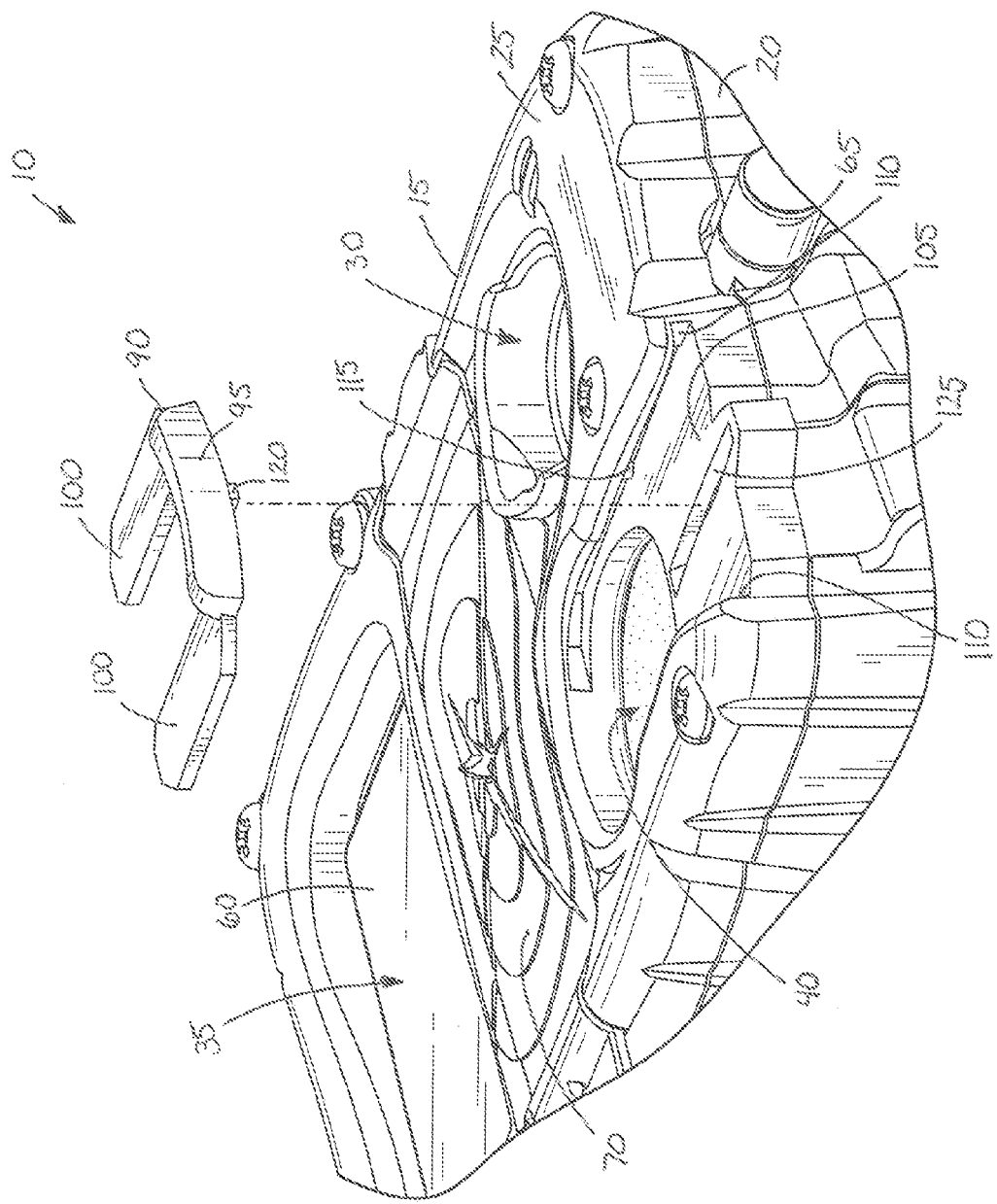
FIG. 3 is an exploded view of the camera assembly of FIG. 1 illustrating a portion of the housing and the curtain.

With continued reference to FIGS. 1-4, the detector 40 also includes a curtain 90 that is movable (e.g., slidable vertically, as shown in FIGS. 1, 2, and 4) between a first position (FIG. 2) in which the curtain 90 does not cover or block a portion of the lens 80, and a second position (FIG. 4) in which the curtain 90 covers or blocks a portion of the lens 80 to adjust the field of view of the detector 40. The illustrated curtain 90 is U-shaped and has a bridge section 95 that interconnects opaque curtain sections 100. The curtain 90 is positioned in a recessed area 105 of the cover 25, and outer edges of the curtain sections 100 slide within channels 110 (FIG. 3) that are defined in the cover 25 so that the curtain 90 is slidable relative to the cover 25. As illustrated in FIG. 3, a detent 115 protrudes into each channel and acts on the curtain sections 100 near the bridge when the curtain 90 is in the second position to hold the curtain 90 in the second position. In other constructions, the cover 25 can be provided without a detent 115 such that general frictional resistance between the cover 25 and the sides of the curtain sections 100 can hold the curtain 90 in place. The curtain 90 also optionally has a projection or guide post 120 along a backside of the curtain 90 that engages a slot 125 in the cover 25 within the recessed area 105 to guide movement of the curtain 90 between the first position and the second position. The guide post 120 and the slot 125 also cooperatively inhibit removal of the curtain 90 from the cover 25 absent a user's desire to do so.

FIGS. 1 and 2 show the curtain 90 in the first position (a storage position) in which the curtain sections 100 do not cover the lens 80 such that the detector 40 has a predetermined wide field of view. As shown in FIG. 3, the bridge section 95 has a higher profile than the curtain 90 protections so that a user can easily grasp the curtain 90 to move the curtain 90 between the first position and the second position. FIG. 4 illustrates the curtain 90 in the second position in which the curtain sections 100 cover laterally opposite sides of the lens 80 such that the detector 40 has a narrow field of view (e.g., 5-45°). That is, the curtain sections 100 narrow the area in front of the camera assembly 10 in which the sensor 75 can detect infrared light. As a result, the PIR sensor 75 can only receive infrared light through the lens 80 between the curtain sections.

A user can adjust the field of view of the detector 40 from the wide field of view to the narrow field of view by sliding the curtain 90 from the first position to the second position so that the curtain sections 100 cover 25 the side areas of the lens 80. In the second position, only the center area of the lens 80 focuses light onto the PIR sensor 75. In addition to visual cues, the user can determine that the curtain 90 has reached the second position because the detent 115 will no longer act on the sides of the curtain sections 100 (i.e., the frictional resistance caused by the detent 115 ceases when the curtain 90 reaches the second position). As illustrated, the distance that the curtain 90 moves within the recessed area 105 between the first position and the second position is relatively small (e.g., less than approximately 1 inch), although the distance can change depending on the design of the camera assembly 10.

The width of the curtain sections 100 determines the width of the field of view for the detector 40. The illustrated curtain 90 is removable from the cover 25, so that the field of view of the detector can be modified, if desired, by replacing the curtain 90 with another curtain 90 that has wider or narrower curtain sections 100. To remove the curtain 90, a user gently lifts the bridge section 95 to disengage the guide post 120 from the slot 125, and then slides the curtain 90 along the channels 110 (downward as viewed in FIGS. 2 and 4) until the curtain sections 100 are disengaged from the cover 25. The user can then insert another curtain 90 into the recessed area 105 by sliding the curtain sections 100 of the new curtain 90 into the channels 110 until the guide post 120 engages the slot 125.

FIGS. 5 and 6 illustrate a second embodiment of the curtain. For ease of reference, the same camera is illustrated and referenced for all embodiments of the curtain, with only a slight change in the cover. The illustrated camera assembly 10 includes a different cover 130 and a pair of curtains 135 that are movable between respective first positions in which the curtains 135 do not cover or block a portion of the lens 80, and respective second positions in which the curtains 135 cover or block a portion of the lens 80 to adjust the field of view of the detector 40. In particular, the cover 130 has recessed areas 140 on opposite sides of the detector 40 to accommodate the curtains 135 so that either or both of the curtains 135 can slide between the first positions and the second positions to adjust the field of view for the detector 40.

Each of the illustrated curtains 135 is rectangular and includes a user-engagement section 145 and an opaque curtain section 150. The user-engagement section 145 has a raised profile so that a user can manipulate the curtain 135 between the first and second positions. Like the curtain sections 100 described with regard to FIGS. 1-4, outer edges of the curtain sections 150 are disposed in channels (not shown) that are defined in the cover 130 so that the curtain 135 is slidable relative to the cover 130. The cover 130 also can include a detent (not shown) to act on the curtain sections 150 when the curtain 135 is in the second position to resist movement of the curtain 135 from the second position. Also, each curtain 135 can have a guide post (not shown), similar to the guide post 120 described relative to FIGS. 1-4, that is disposed along the underside to engage a corresponding slot 155 in the cover 130 to guide movement of the curtain 135 between the first position and the second position. The guide post and the slot 155 function similarly to the guide post 120 and the slot 155 described with regard to FIGS. 1-4, and as such, will not be described in detail.

FIG. 5 illustrates the curtains 135 in the first position (a storage position) in which the curtain sections 150 do not cover the lens 80 such that the detector 40 has a predetermined wide field of view. FIG. 6 illustrates the curtains 135 in the second position in which the curtain sections 150 cover laterally opposite sides of the lens 80 such that the detector 40 has a narrow field of view. That is, the curtain sections 150 narrow the area in front of the camera assembly 10 in which the sensor 75 can detect and respond to infrared light.

As will be appreciated, the curtains 135 illustrated in FIGS. 5 and 6 can slide together or independently relative to each other within the recessed areas 140 to modify the field of view for the detector 40. For example, when movement of one curtain 135 depends on movement of the other curtain 135, both curtains 135 slide simultaneously between the first position and the second position in response to manipulation of one of the curtains 135. When each curtain 135 is independently movable, a user can manipulate either the left curtain 135 or the right curtain 135 between the first position and the second position to adjust the field of view for the detector 40 without also moving the other curtain 135. Moreover, a user can manipulate independently movable curtains 135 consecutively or simultaneously between the first and second positions. More generally, the field of view for the detector 40 can be stepwise or continuously adjusted from the widest field of view provided to the narrowest field of view available by sliding one or both of the curtains 135 a desired amount. In this regard, this second embodiment of the curtain is infinitely variable between the first position and the second position.

A user can adjust the detector 40 from the wide field of view by sliding one or both curtains 135 from the first position toward or to the second position so that the corresponding curtain sections 150 cover the side areas of the lens 80. As a result, only the center area of the lens 80 focuses light onto the PIR sensor 75. Because the illustrated curtains 135 are oriented to slide horizontally between the first and second positions, a detent is not necessary to hold the curtains 135 in the desired position. The distance that the curtains 135 move within the recessed areas 140 between the first position and the second position is relatively small (e.g., less than approximately 1 inch).

Figure 8:
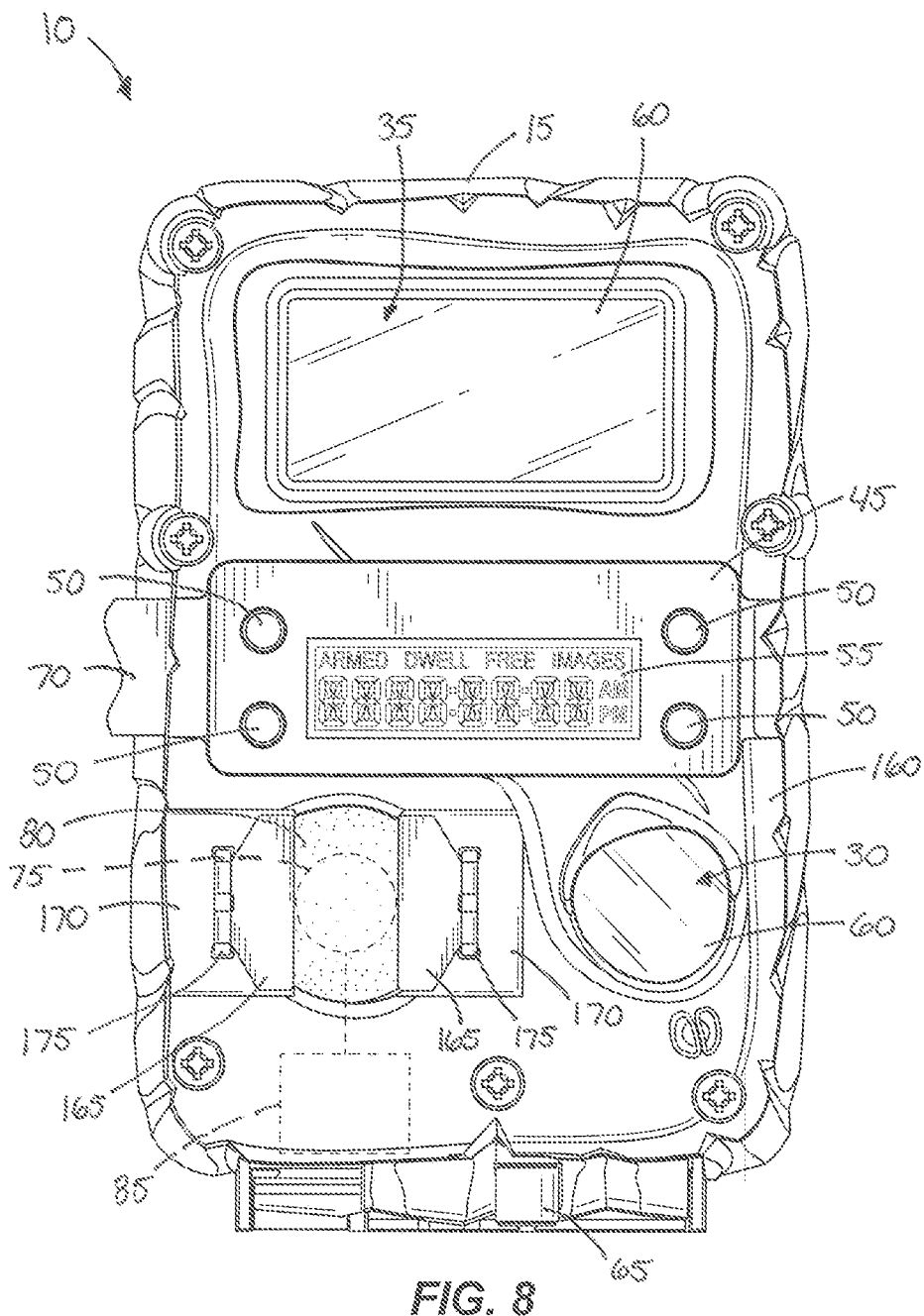
FIG. 8 is a front view of the camera assembly of FIG. 7 illustrating the curtain in a second position.

FIGS. 7 and 8 illustrate a third embodiment of the curtain, where the camera assembly 10 includes a different cover 160 and another pair of curtains 165 that are movable between respective first positions in which the curtains 165 do not cover or block a portion of the lens 80, and respective second positions in which the curtains 165 cover or block a portion of the lens 80 to adjust the field of view of the detector 40. More specifically, each of the illustrated curtains 165 is disposed in a recessed area 170 of the cover 160 and is pivotable (e.g., like shutters) about a corresponding pivot 175 between the first position and the second position. The curtains 165 have opaque curtain sections that are manipulatable by a user to adjust the field of view for the detector 40.

FIG. 7 illustrates the curtains 165 in the first position such that the detector 40 has a predetermined wide field of view. FIG. 8 illustrates the curtains 165 pivoted to the second position to cover laterally opposite sides of the lens 80 such that the detector 40 has a narrow field of view in which the PIR sensor 75 can only receive and respond to infrared light through the lens 80 between the curtains 165.

The curtains 165 are independently movable between the first and second positions so that one or both sides of the lens 80 can be covered. The independently movable curtains 165 provide stepwise or continuous adjustment of the field of view for the detector 40 between the widest field of view provided and the narrowest field of view available by pivoting one or both of the curtains 165 to cover as much or as little of the lens 80 as desired. In particular, a user can adjust the field of view of the detector 40 from the wide field of view to a narrower field of view by pivoting one or both curtains 165 from the first position toward or to the second position so that the corresponding curtain sections 180 cover at least some of the side areas of the lens 80. As a result, only the central area of the lens 80 focuses light onto the PIR sensor 75. Like the curtains 165 described with regard to FIGS. 1-6, the illustrated curtains 165 are removable from the cover 160 so the narrow field of view can be modified, if desired, by replacing the curtains 165 with wider or narrower curtains 165.

Figures 9, 10:
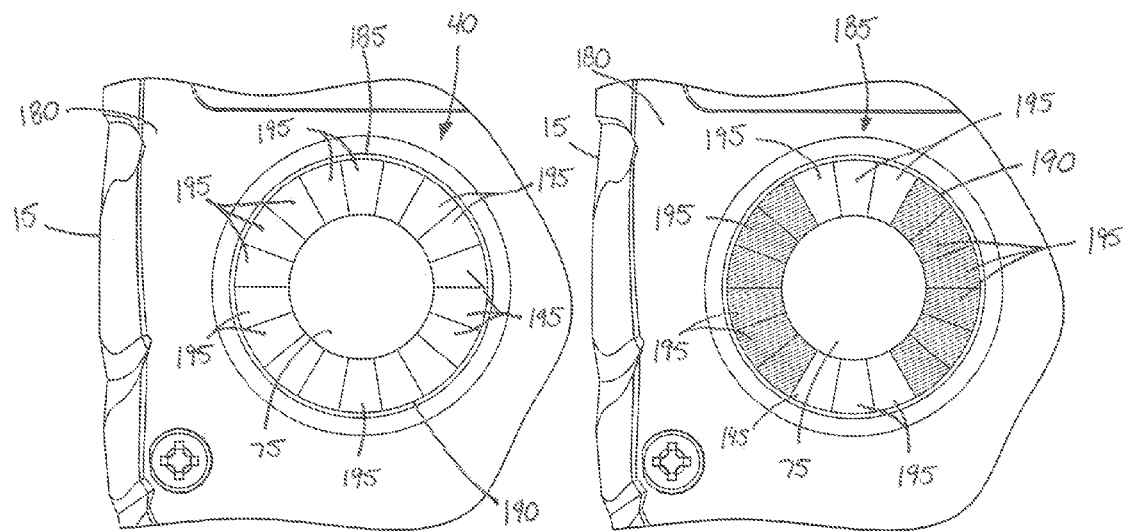
FIG. 9 is a front view of a fourth embodiment of the present invention including an electronic curtain in a first position.
FIG. 10 is a front view of the camera assembly portion of FIG. 9 illustrating the electronic curtain in a second position.

FIGS. 9 and 10 illustrate a fourth embodiment of the curtain. In this embodiment, the camera assembly includes a different cover 180 and an electronic or digital curtain 185 for the camera assembly 10. The digital curtain 185 can be formed as part of the sensor 75, provided as a separate component disposed between the sensor 75 and the lens 80, or be incorporated into the control logic of a digital processor (e.g., the processor can selectively ignore signals form certain pixels). In some constructions, the camera assembly 10 can be provided without a separate lens 80 (e.g., the lens 80 can be incorporated into the sensor 75, or not provided at all). As illustrated, the digital curtain 185 has a digital pixel array 190 that surrounds the center of the sensor 75 and that is variable between a first position (e.g., an "on state") in which the detector 40 has a wide field of view, and a second position (e.g., an "off state") in which the detector 40 has a narrow field of view. The pixel array 190 has a plurality of pixels 195 concentrically arranged around the center of the sensor 75, which remains exposed to the environment surrounding the camera assembly 10 regardless of the state of the pixel array 190.

FIG. 9 shows the detector 40 with the pixel array 190 in the on state (i.e., the detector 40 has the wide field of view). More specifically, all of the pixels 195 are in the on state such that the sensor 75 responds to infrared light detected by any of the pixels 195 (i.e., the detector 40 has a wide field of view) or by the center, non-pixilated area of the sensor 75. If desired, some or all of the pixels 195 can be varied to the off state so that the detector 40 has a narrower field of view by manipulating a button or switch (not shown) on the housing 15. Generally, the quantity of pixels 195 that are in the off state determines how narrow the field of view will be for the detector 40. FIG. 10 shows the detector 40 with some of the pixels 195 in the off state (illustrated as grayed-out in FIG. 10) such that the detector 40 has a narrow field of view (i.e., only the center area of the sensor 75 and the vertically-centered pixels 195 receive and respond to infrared light). Depending on the level of control provided in the camera assembly 10, one or more of the pixels 195 can be individually or collectively varied (using corresponding controls or switches on the camera assembly 10) between the on and off states to achieve the desired field of view for the detector 40.

Figures 11, 12:
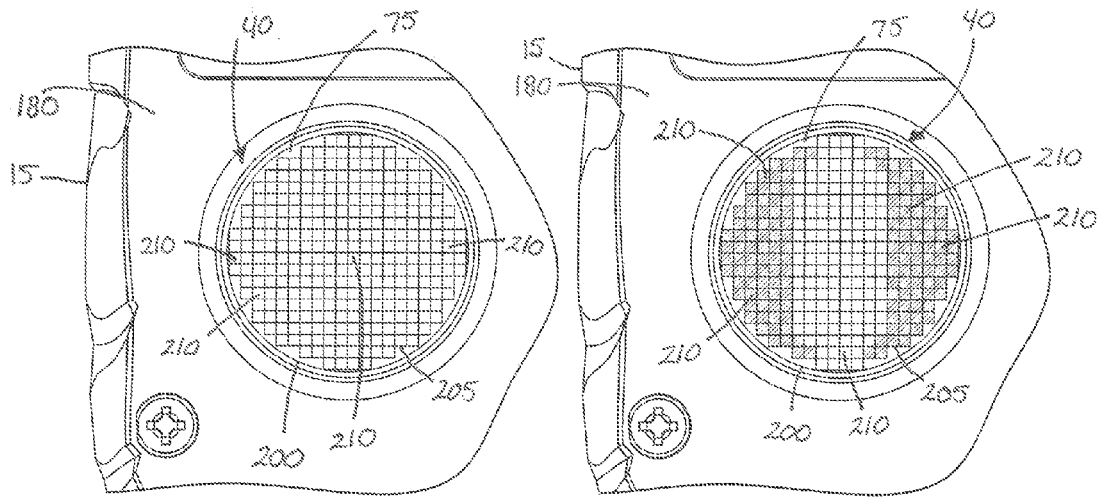
FIG. 11 is a front view of a fifth embodiment of the present invention including another electronic curtain in a first position.
FIG. 12 is a front view of the camera assembly portion of FIG. 11 illustrating the electronic curtain in a second position.

FIGS. 11 and 12 illustrate a fifth embodiment of the curtain. Like the fourth embodiment, the fifth embodiment is another electronic or digital curtain 200 for the camera assembly 10. Like the digital curtain 185 described with regard to FIGS. 9 and 10, the digital curtain 200 shown in FIGS. 11 and 12 can be formed as part of the sensor 75, provided as a separate component or layer disposed between the sensor 75 and the lens 80 (e.g., on the surface of the sensor 75), or be incorporated into the control logic of a digital processor (e.g., the processor can selectively ignore signals form certain pixels). Likewise, the camera assembly 10 can be provided without a separate lens 80 (e.g., the lens 80 can be incorporated into the sensor 75, or not provided at all).

As illustrated, the digital curtain 200 has a digital pixel array 205 with a plurality of pixels 210 arranged in a matrix across the sensor 75. Each pixel 210 can be varied (individually or collectively with at least some of the remaining pixels 210) between a first position (e.g., an "on state") and a second position (e.g., an "off state") to adjust the field of view for the detector 40. When all of the pixels 210 are in the on state, the detector 40 has a wide field of view. In other words, the sensor 75 receives and responds to infrared light detected by any of the pixels 210. When one or more pixels 210 are in the off state, the detector 40 will have a narrower field of view (i.e., a field of view that is smaller than the wide field of view) such that the sensor 75 only responds to infrared light detected by the pixels 210 in the on state.

FIG. 11 shows the detector 40 with all of the pixels 210 in the on state (i.e., the detector 40 has the wide field of view). If desired, a user can vary some or all of the pixels 210 to the off state so that the detector 40 has a narrower field of view by manipulating a button or switch (not shown) on the housing 15. FIG. 12 shows the detector 40 with pixels 210 on opposite sides of the sensor 75 (left and right sides as viewed in FIG. 12) in the off state (illustrated as grayed-out in FIG. 12) such that only the centrally located pixels 210 are in the on state and respond to infrared light, thus narrowing the detector's field of view. Depending on the level of control provided in the camera assembly 10, individual pixels 210 or groups of pixels 210 can be varied between the on and off states to achieve the desired field of view for the detector 40.

Figure 13:
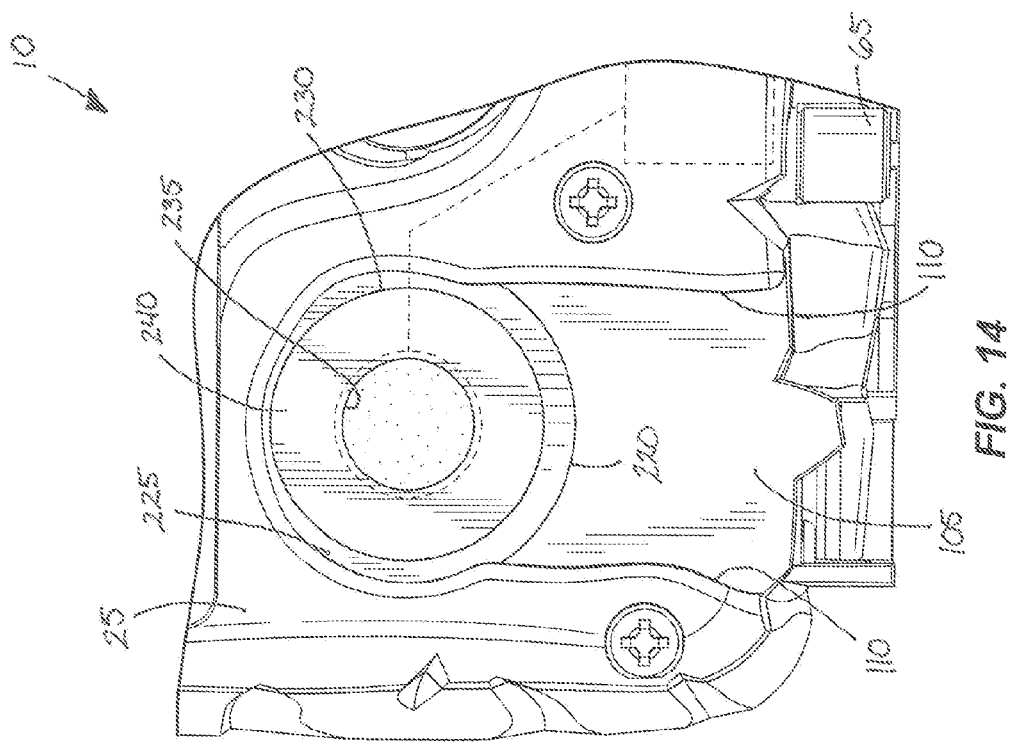
FIG. 13 is a perspective view of a sixth embodiment of the present invention including another curtain in a first position.
Figure 14:
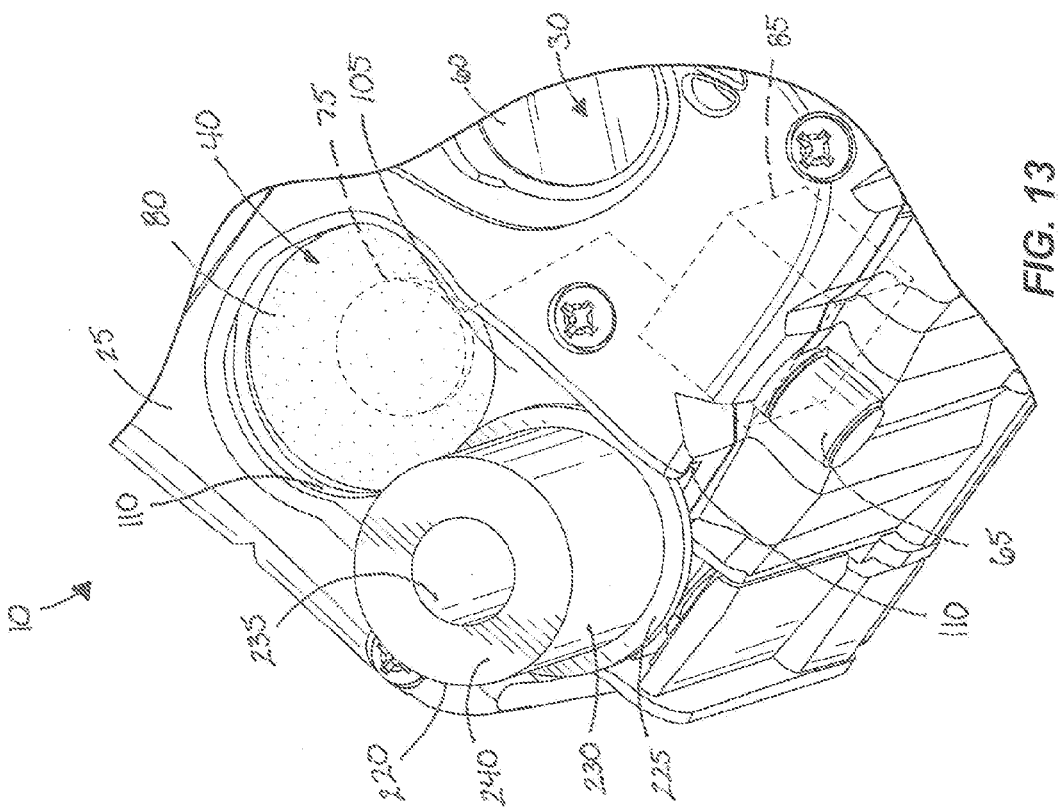
FIG. 14 is a front view of the camera assembly portion of FIG. 13 illustrating the curtain in a second position.

FIGS. 13 and 14 illustrate a sixth embodiment of a curtain 220 for the camera assembly 10. The camera assembly 10 includes the cover 25 (or a similar cover) and the recessed area 105, and the curtain 220 is movable between a first position (FIG. 13) in which the curtain 220 does not cover or block a portion of the lens 80, and a second position (FIG. 14) in which the curtain 220 covers or blocks a portion of the lens 80 to adjust the field of view of the detector 40. More specifically, the illustrated curtain 220 is disposed in the recessed area 105 of the cover 160 and has a flange 225 that slides within the channels 110 between the first position and the second position.

The curtain 220 is further defined by a cylindrical body 230 extending outward from the flange 225. The cylindrical body 230 has a hollow central shaft 235 and an opaque curtain section 240 disposed concentrically about the central shaft 235 (i.e., the radially inward surface of the curtain section 240 defines the central shaft 235). The central shaft 235 passes completely through the body 230 and the flange 225 so that some infrared light can still reach the PIR sensor 75. The central shaft 235 has a predetermined width or diameter that determines the field of view of the detector 40.

FIG. 13 illustrates the curtain 220 in the first position such that the detector 40 has a predetermined wide field of view. FIG. 14 illustrates the curtain 220 slid to the second position to cover the outermost radial portion of the lens 80 such that the detector 40 has a narrow field of view in which the PIR sensor 75 can only receive and respond to infrared light through the lens 80 directed along the central shaft 235. The curtain 220 is movable between the first and second positions so that the detector has the predetermined wide field of view (determined based on the field of view of the lens 80), or a narrow field of view (determined by the width of the central shaft 235). A user can adjust the field of view of the detector 40 from the wide field of view to a narrower field of view by moving the curtain from the first position to the second position. In the second position, only the central area of the lens 80 focuses light onto the PIR sensor 75. Like the curtains 165 described with regard to FIGS. 1-8, the illustrated curtain 220 is removable from the cover 160 so the narrow field of view can be modified, if desired, by replacing the curtain 220 with a wider or narrower curtain 220.

Figure 15:
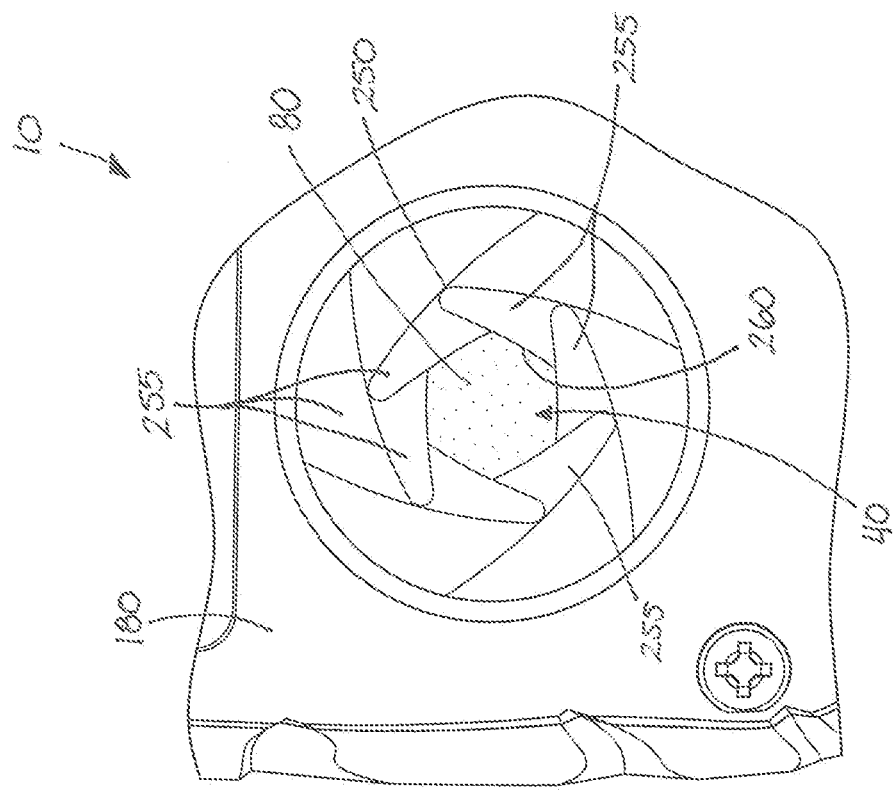
FIG. 15 is a front view of a seventh embodiment of the present invention including another curtain in a first position.
Figure 16:
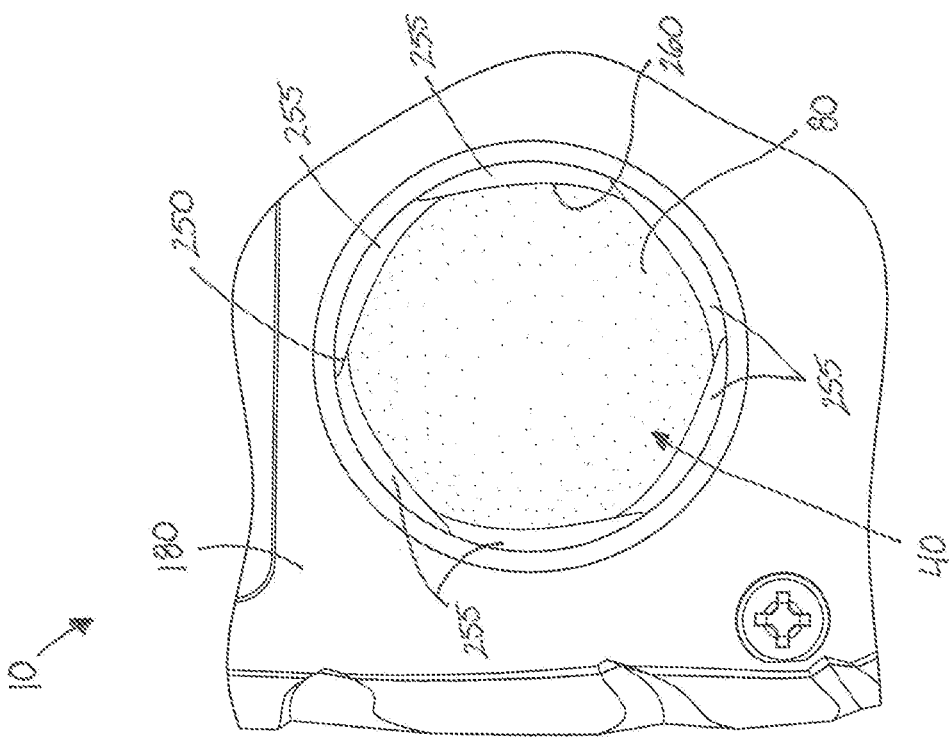
FIG. 16 is a front view of the camera assembly portion of FIG. 15 illustrating the curtain in a second position.

FIGS. 15 and 16 illustrate a seventh embodiment of a curtain 250 for the camera assembly 10. The camera assembly 10 includes the cover 180 described with regard to FIGS. 9-12. The curtain 250 has a plurality of overlapping, opaque blades 255 arranged around the perimeter of the lens 80 to form a mechanical aperture 260 at the center of the blades 255. The blades 255 are adjustable between a first position in which the curtain 250 does not cover or block a significant portion of the lens 80, and a second position in which the curtain 250 covers or blocks a significant portion of the lens 80 to adjust the field of view of the detector 40. The PIR sensor 75 is not shown in FIGS. 15 and 16 for clarity.

The curtain 250 can be a mechanical or electro-mechanical device that moves the blades 255 generally radially inward and radially outward to adjust the size of the aperture, and thus the amount of light passing through the lens 80. For example, movement of the blades can be accomplished mechanically by twisting or rotating a knob on the cover 180 or electrically or electronically via a control on the cover 180 (e.g., a pushbutton on the cover 180). The blades 255 can be continuously or step-wise movable between the first position and the second position to achieve a desired aperture size corresponding to a desired field of view.

FIG. 15 illustrates the curtain 250 in the first position such that the detector 40 has a predetermined wide field of view. FIG. 16 illustrates the curtain 250 with the blades 255 moved radially inward toward the second position to cover the outermost radial portion of the lens 80 such that the detector 40 has a narrow field of view through the aperture 260. In the position illustrated in FIG. 16, the PIR sensor 75 can only receive and respond to infrared light through the lens 80 directed through the aperture 260.

The detector 40 triggers the camera 30 to take a picture or start a video when the PIR sensor 75 detects and responds to infrared light (or a change in infrared light) within the field of view of the detector 40. More specifically, the processor 85 receives information from the sensor 75 regarding the position of the subject within the maximum field of view provided by the detector 40, and is programmed to actuate the camera 30 when the subject is within the field of view. The adjustable field of view for the detector 40 allows a user to selectively choose a wide field of view to capture a subject anywhere in the camera's field of vision, or a narrower field of view to capture a subject closer to the center of the camera's field of vision. While specific examples of mechanical and electronic or digital curtains are discussed in detail with regard to FIGS. 1-16, is should be appreciated that other curtains can be used to selectively narrow the field of view of the detector 40.

With regard to the curtains described with regard to FIGS. 1-8 and 13-16, when the curtain 90, 135, 165, 220, 250 is in the first position, the field of view of the detector 40 is the same as the camera's field of vision. When the curtain 90, 135, 165, 220, 250 is moved to the second position, the field of view of the detector 40 is narrower than the camera's field of vision so that the media taken with the camera assembly 10 will more likely show the subject centered on the media. A narrower field of view for the detector 40 also will be more likely to accurately and completely capture the subject in the media. Moreover, a user can manipulate the curtain 90, 135, 165, 220, 250 to adjust the field of view as desired.

With regard to the digital curtains described with regard to FIGS. 9-12, in some constructions the pixels 195, 210 that are in the off state may receive infrared light emanating from the environment. In these constructions, the processor 85 receives information from the sensor 75 regarding the position of the subject within the maximum field of view (i.e., the widest field of view provided for the detector 40) in response to any pixel 195, 210 detecting infrared light. However, the processor 85 in these constructions is programmed to trigger the camera 30 only when the subject is within the adjusted field of view that is narrower than the maximum field of view. In other words, the detector 40 recognizes a subject that is in the wide field of view and communicates this recognition to the processor 85, but the processor 85 does not trigger the camera 30 until at least one of the pixels 195, 210 that is in the on state (or the center area of the sensor 75 of FIGS. 9 and 10) receives and responds to infrared light. Thus, the processor does not trigger the camera 30 when a pixel 195, 210 in the off state receives to infrared light.

Various features and advantages of the invention are set forth in the following claims.

The invention claimed is:

1. An automated camera assembly comprising:
a camera having a field of vision; and
a detector for detecting a subject and triggering the camera, the detector including an adjustable field of view, wherein the detector includes:
a sensor having a maximum field of view; and
a curtain for reducing the maximum field of view to an adjusted field of view, wherein the curtain comprises at least two sections coupled to move together from a first position corresponding with the maximum field of view to a second position corresponding with the adjusted field of view smaller than the maximum field of view; wherein the at least two sections are positioned on opposing sides of the sensor in the second position.

2. An automated camera assembly as claimed in claim 1, wherein the camera is a digital camera.

3. An automated camera assembly as claimed in claim 1, wherein the detector includes an infrared sensor.

4. An automated camera assembly as claimed in claim 1, wherein the curtain sections comprise opaque members movable relative to the sensor.

5. An automated camera assembly as claimed in claim 4, wherein the curtain is mounted for linear movement relative to the sensor.

6. An automated camera assembly as claimed in claim 4, wherein the curtain is mounted for pivotal movement relative to the sensor.

7. An automated camera assembly as claimed in claim 4, wherein the curtain is mounted for radial movement relative to the sensor.

8. A method of adjusting a field of view of a detector on an automated camera assembly having a camera positioned within a housing, the detector including a curtain having at least two sections coupled for simultaneous movement, the method comprising:
detecting a first subject within a maximum field of view of the detector;
triggering the camera after detecting the first subject within the maximum field of view;
adjusting the maximum field of view of the detector to an adjusted field of view of the detector by moving the at least two curtain sections together from a first position corresponding with the maximum field of view to a second position corresponding with the adjusted field of view smaller than the maximum field of view; wherein the detector comprises a sensor, and wherein adjusting includes positioning the two curtain members on opposing sides of the maximum field of view to partially block the maximum field of view;
detecting a second subject within the adjusted field of view; and
triggering the camera after detecting the second subject within the adjusted field of view.

9. A method as claimed in claim 8, wherein moving comprises linearly sliding the curtain members relative to the sensor.

10. A method as claimed in claim 8, wherein moving comprises pivoting the curtain members relative to the sensor.

11. A method as claimed in claim 8, wherein the automated camera assembly further includes a processor that receives information from the detector regarding the position of the subject within the maximum field of view and triggers the camera when the subject is within an adjusted field of view less than the maximum field of view.

* * * * *